US012293279B2

(12) United States Patent
Cecil et al.

(10) Patent No.: US 12,293,279 B2
(45) Date of Patent: May 6, 2025

(54) NEURAL NETWORK BASED MASK SYNTHESIS FOR INTEGRATED CIRCUITS

(71) Applicant: Synopsys, Inc., Mountain View, CA (US)

(72) Inventors: Thomas Christopher Cecil, Menlo Park, CA (US); Kevin Hooker, Austin, TX (US); Marco Guajardo, Austin, TX (US)

(73) Assignee: Synopsys, Inc., Sunnyvale, CA (US)

( * ) Notice: Subject to any disclaimer, the term of this patent is extended or adjusted under 35 U.S.C. 154(b) by 822 days.

(21) Appl. No.: 17/003,870

(22) Filed: Aug. 26, 2020

(65) Prior Publication Data

US 2021/0064977 A1 Mar. 4, 2021

Related U.S. Application Data

(60) Provisional application No. 62/893,214, filed on Aug. 29, 2019.

(51) Int. Cl.
*G06N 3/063* (2023.01)
*G06F 30/392* (2020.01)
(Continued)

(52) U.S. Cl.
CPC ........... *G06N 3/063* (2013.01); *G06F 30/392* (2020.01); *G06N 3/04* (2013.01); *G06N 3/08* (2013.01); *G06F 2119/02* (2020.01)

(58) Field of Classification Search
CPC ........... G06N 3/063; G06N 3/04; G06N 3/08; G06N 3/045; G06N 3/084; G06F 30/392;
(Continued)

(56) References Cited

U.S. PATENT DOCUMENTS

| 11,561,477 | B2* | 1/2023 | Su | G06N 3/045 |
| 2003/0229881 | A1* | 12/2003 | White | H01L 21/31053 |
| | | | | 257/E21.244 |

(Continued)

FOREIGN PATENT DOCUMENTS

| CN | 108475351 A | 8/2018 |
| CN | 108475417 A | 8/2018 |

(Continued)

OTHER PUBLICATIONS

Sangveraphunsiri, Viboon, and Kiattisak Sritrakulchai. "The development of a technique for 3D complex surface reconstruction from unorganized point cloud." The International Journal of Advanced Manufacturing Technology 33 (2007): 772-781. (Year: 2007).*

(Continued)

*Primary Examiner* — Michael W Ayers
*Assistant Examiner* — Sidney Vincent Bostwick
(74) *Attorney, Agent, or Firm* — Fenwick & West LLP

(57) ABSTRACT

A system uses machine learning models, such as neural networks for generating mask design from a circuit design. The machine learning models have inputs and outputs which are localized to a small region of the circuit design. The machine learning model takes as input features describing the circuit design in the neighborhood of a location and generates an offset distance as output. The system uses the offset distance to generate features of the mask design, for example, main features or assist features corresponding to a circuit design polygon. The system may use the offset distance for target optimization by modifying the circuit design polygon to obtain a circuit design polygon that has improved manufacturability.

20 Claims, 15 Drawing Sheets

(51) Int. Cl.
  *G06F 119/02* (2020.01)
  *G06N 3/04* (2023.01)
  *G06N 3/08* (2023.01)

(58) Field of Classification Search
  CPC ...... G06F 2119/02; G06F 30/27; G06F 30/30; G06F 30/394; G06F 30/398; G03F 1/70; G03F 7/70441; G03F 1/36
  See application file for complete search history.

(56) References Cited

U.S. PATENT DOCUMENTS

| | | | |
|---|---|---|---|
| 2013/0159943 A1* | 6/2013 | Agarwal | G03F 7/70433 716/52 |
| 2016/0325504 A1* | 11/2016 | Mossavat | B29C 64/386 |
| 2017/0323224 A1 | 11/2017 | Bruestle et al. | |
| 2018/0095359 A1 | 4/2018 | Jeong | |
| 2020/0166909 A1* | 5/2020 | Noone | G06N 20/00 |
| 2020/0380362 A1* | 12/2020 | Cao | G06N 3/08 |
| 2022/0335290 A1* | 10/2022 | Pisarenco | G06N 3/045 |

FOREIGN PATENT DOCUMENTS

| | | |
|---|---|---|
| JP | 2003-315973 A | 11/2003 |
| JP | 2005-092212 A | 4/2005 |
| JP | 2009-294440 A | 12/2009 |
| JP | 2010-044101 A | 2/2010 |
| JP | 2010-156866 A | 7/2010 |
| JP | 4883591 B2 | 2/2012 |
| JP | 2019-139008 A | 8/2019 |
| TW | 201734825 A | 10/2017 |
| TW | 201809856 A | 3/2018 |
| TW | I639887 B | 11/2018 |
| WO | WO 2018/235669 A1 | 12/2018 |
| WO | WO 2019/048506 A1 | 3/2019 |

OTHER PUBLICATIONS

Su, Hong-Yan, et al. "A novel fast layout encoding method for exact multilayer pattern matching with Prüfer encoding." IEEE Transactions on Computer-Aided Design of Integrated Circuits and Systems 34.1 (2014): 95-108. (Year: 2014).*
Taiwan Intellectual Property Office, Office Action, Taiwanese Patent Application No. 109129540, Aug. 23, 2021, 16 pages.
PCT International Search Report and Written Opinion, PCT Application No. PCT/US2020/048607, Dec. 7, 2020, 15 pages.
Japan Patent Office, Office Action, Japanese Patent Application No. 2022-513227, May 30, 2024, 10 pages.

* cited by examiner

NEURAL NETWORK BASED MASK SYNTHESIS FOR INTEGRATED CIRCUITS

CROSS REFERENCE TO RELATED APPLICATIONS

This application claims a benefit of U.S. Patent Application Ser. No. 62/893,214, filed Aug. 29, 2019, the contents of which are incorporated by reference herein.

TECHNICAL FIELD

This disclosure relates to the field of electronic design automation in general, and more specifically to mask synthesis for integrated circuits based on machine learning based models such as neural networks.

BACKGROUND

In semiconductor processing, photoresist masks are used to define patterns of various layers of a semiconductor device. Photoresist masks are formed by depositing a layer of photosensitive material (i.e., photoresist) over a semiconductor structure, exposing the photoresist layer to an illumination source through a patterned photolithography mask (photomask), and then removing the unexposed (or exposed) portions of the photoresist layer. Material exposed through the photomask (e.g., metal) can be etched, thereby transferring the pattern on the photomask to the semiconductor device. Interference and other processing effects can result in undesired deviations between in the desired pattern and the actual pattern transferred to the photoresist material. These undesired deviations can significantly affect the performance of the resulting semiconductor device. In order to minimize these deviations, various compensation schemes have been implemented, including modifying the patterns provided on the photomask using optical proximity correction (OPC) methods. The various processes involved in mask synthesis OPC are computationally expensive, thereby making the design process slow and expensive.

SUMMARY

Disclosed is a configuration (e.g., system, method, non-transitory computer readable storage medium storing instructions executable by a processor) for generating mask design for a circuit design. A system receives a circuit design including circuit design polygons. The system accesses a neural network configured to receive as input, features describing the circuit design within a neighborhood of an input location and output an offset distance from an edge of a circuit design polygon. The system uses the neural network to determine offset distances for locations associated with circuit design polygons. For example, the system may select locations along the edges of a circuit design polygon and generate offset distances from the edges of the polygon. The system generates mask design polygons based on the offset distances. The mask design polygon may represent a feature corresponding to the circuit design polygon, for example, a main feature or an assist feature. The system generates a mask design for the circuit design using the mask design polygons.

The features corresponding to a location of the circuit design may include the width of the circuit design polygon in the neighborhood of the location, the curvature of the circuit design polygon in the neighborhood of the location, the depth of space between the polygon and neighboring polygons, and so on. The system may select samples points in the neighborhood of the location and use values describing the circuit design at the sample points. For example, the system may sample distances to design edges or perform lithography simulation of the circuit design to generate a resist image and use features of the resist image at various sample points, for example, maxima, minima, or slope of the resist image.

The neural network is trained using labeled dataset based on previously generated mask designs.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
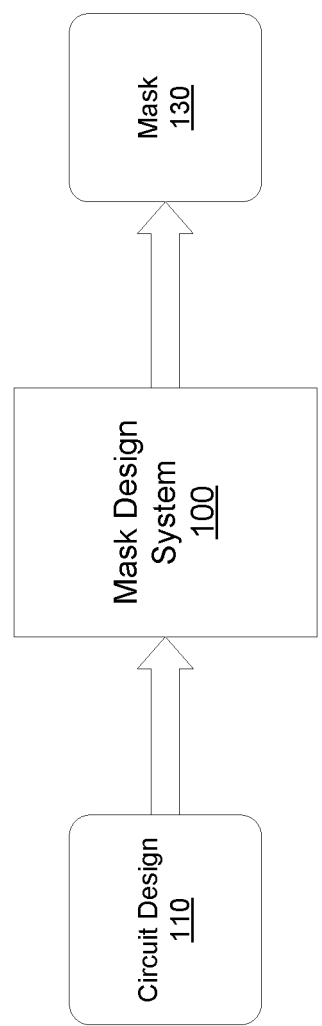
FIG. 1 illustrates the overall process of mask synthesis for a circuit design according to an embodiment.

The electronic design automation (EDA) process includes a tape-out stage that creates data to be used for production of lithography masks. During mask synthesis, the tape-out data is used to produce lithography masks that are used to produce finished integrated circuits. Mask optimization is an important problem in the very large-scale integration (VLSI) design flow due to the mismatch between the lithography system and the continuously shrinking feature sizes. Optical proximity correction (OPC) is a resolution enhancement technique (RET) used for improving mask printability. However, due to shrinking chip dimensions and increases in circuit complexity, the mask optimization process consumes more and more computational resources.

Some approaches for mask design utilize a convolutional neural network that represents the mask and the circuit design as pixelated images. The mask synthesis optimal proximity connection (OPC) problem is not formulated in terms of pixelated images. The mask synthesis OPC problem is formulated in terms of incremental edge offsets from the design layout for main features, and larger edge offsets for the assist feature (AF) placements. Therefore, pixel based convolutional neural network mask synthesis require computationally intensive steps of performing data transformation from a grid to/from polygons resulting in slow runtime performance and poor quality of results.

In contrast, the neural networks as disclosed according to various embodiments do not require conversion from/to pixelated representations. The neural networks as disclosed receive as input, features describing the circuit design in the neighborhood of a location and output an offset distance value. The offset distance values are used to generate mask design polygons representing features of the mask design. The models disclosed naturally fit in the edge based OPC framework, thereby making integration with the framework easy and efficient in runtime execution.

Certain pixel-based solutions run into another problem because the placement of the pixel grid with respect to the edges of the design is not consistent when the design pitch is not aligned with the pixel spacing. This is so because the design pitch is smaller than the dimension of a pixel. As a result, transforming the data to a pixel representation and back results in loss of accuracy, thereby providing poor quality of results. In contrast, the disclosed embodiments process polygon edges that does not require conversion to/from a pixel-based representation and therefore do not face this problem.

Furthermore, the techniques disclosed herein use circuit design polygons instead of a pixel-based solution, thereby reducing the problem from a two-dimensional grid to a one-dimensional set of edges. This improves the runtime of the process of generating masks for a circuit design by efficiently obtaining either the final mask solution or an intermediate mask solution. Furthermore, these techniques improve the quality of results for a given amount of computational resources used by replacing computationally expensive techniques such as iterative target optimization or inverse lithography (ILT) techniques with computationally less expensive techniques.

Overall System Environment

FIG. 1 illustrates the overall process of mask design for a circuit design according to an embodiment. A mask design system 100 receives a circuit design 110 as input and generates a mask design. The mask design system 100 uses a machine learning model to determine offsets from edges of geometric shapes of the circuit design to generate the corresponding geometric shapes of the mask design. The mask design system generates features of the mask design based on the offsets output by the machine learning model. Details of the mask design system 100 are shown in FIG. 2 and described in connection with FIG. 2.

Figure 2:
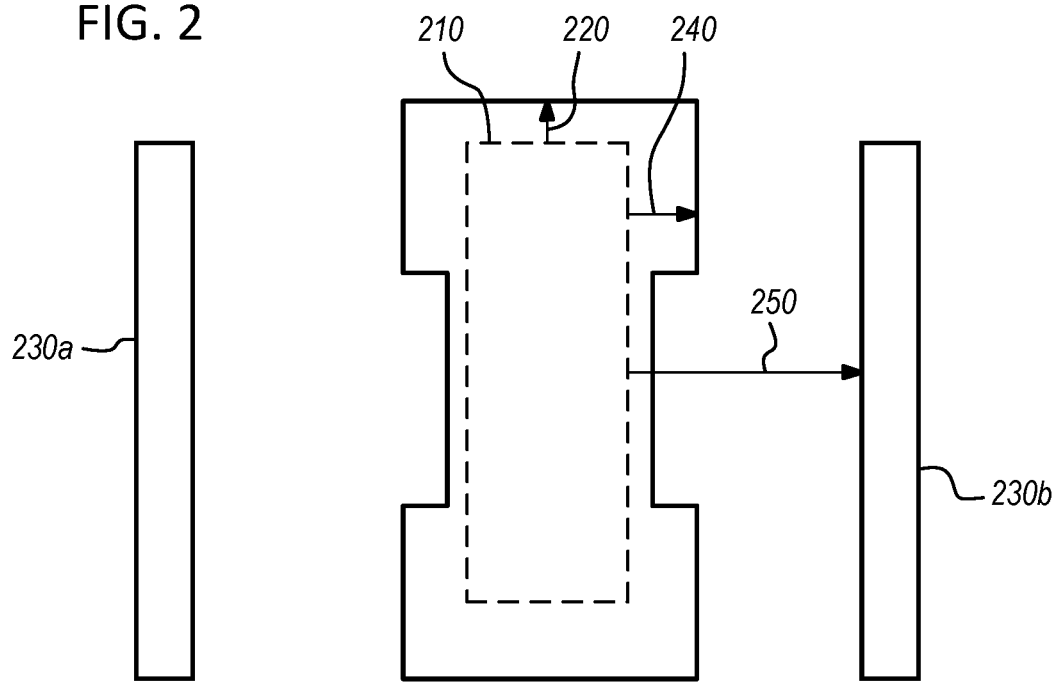
FIG. 2 shows an example mask design with offsets from the circuit design for features of the mask, according to an embodiment.

FIG. 2 shows an example mask design with offsets from the circuit design for features of the mask, according to an embodiment. The polygon 210 represents a geometric shape of a circuit design. The polygon 220 represents a main feature of a mask as generated by the mask design system 100 from the circuit design. The edges of the polygon 220 representing the main feature are determined based on the offset 240 from the corresponding edges of the polygon 210 of the circuit design. The location of the assist feature represented by polygons 230 are determined using the offset 250 from edges of the polygon 210 representing the circuit design.

A technique referred to as target optimization used for the mask synthesis allows the circuit design to be modified. This technique is used for overly constrained cases which can be manufactured with difficulty as drawn but can be perturbed to be manufacturing friendly. Similar to OPC mask optimization, target optimization is formulated as solving for edge offsets from the circuit design and depends on the local geometric environment for each target edge.

Figure 3:
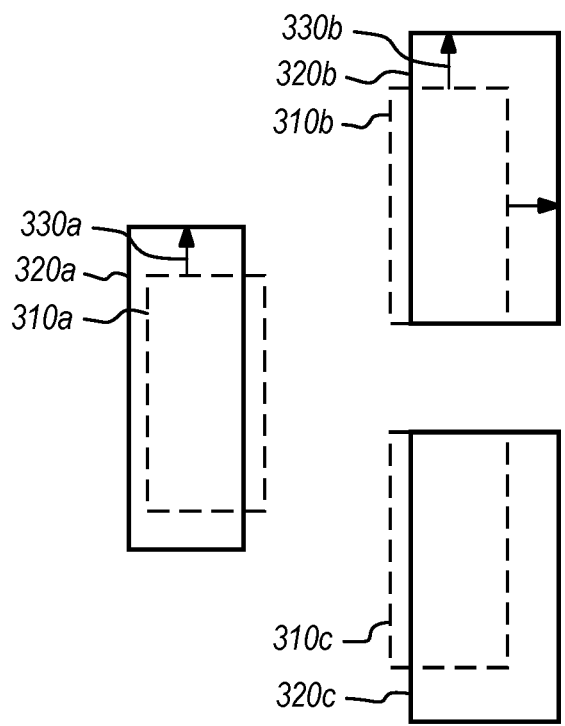
FIG. 3 shows an example of target optimization in mask synthesis, according to an embodiment.

FIG. 3 shows an example of target optimization in mask synthesis, according to an embodiment. The polygons 310 represent geometric shapes of the circuit design. These polygons are modified in accordance with target optimization to obtain polygons 320. For example, polygon 310a is modified to obtain polygon 320a, polygon 310b is modified to obtain polygon 320b, and polygon 310c is modified to obtain polygon 320c. The modification to the polygon 310 to obtain the modified polygon is determined using offsets 330.

Accordingly, the specification of the features including main feature and assist feature as well as modifications of circuit design for target optimization is determined using offsets from edges of polygons of the circuit design. The mask design system 100 uses machine learning based models to determine the offsets used for these techniques.

The machine learning based approach disclosed herein allows for additional OPC correction on top of the results provided by the machine learning model, thereby allowing the output of the machine learning model to be further improved for generating the final mask solution. Accordingly, the machine learning based mask generation acts as a shortcut to get the mask closer to final solution and let OPC finish the correction with less effort. This accelerates the overall design process. Some embodiments perform target optimization by applying the machine learning based model to determine the offset for adjusting the circuit design polygons and then perform OPC to correct the mask based on this new target using standard OPC methods. The resulting mask solution is obtained with improved runtime efficiency and also has higher accuracy compared to conventional techniques.

Mask Synthesis System

Figure 4:
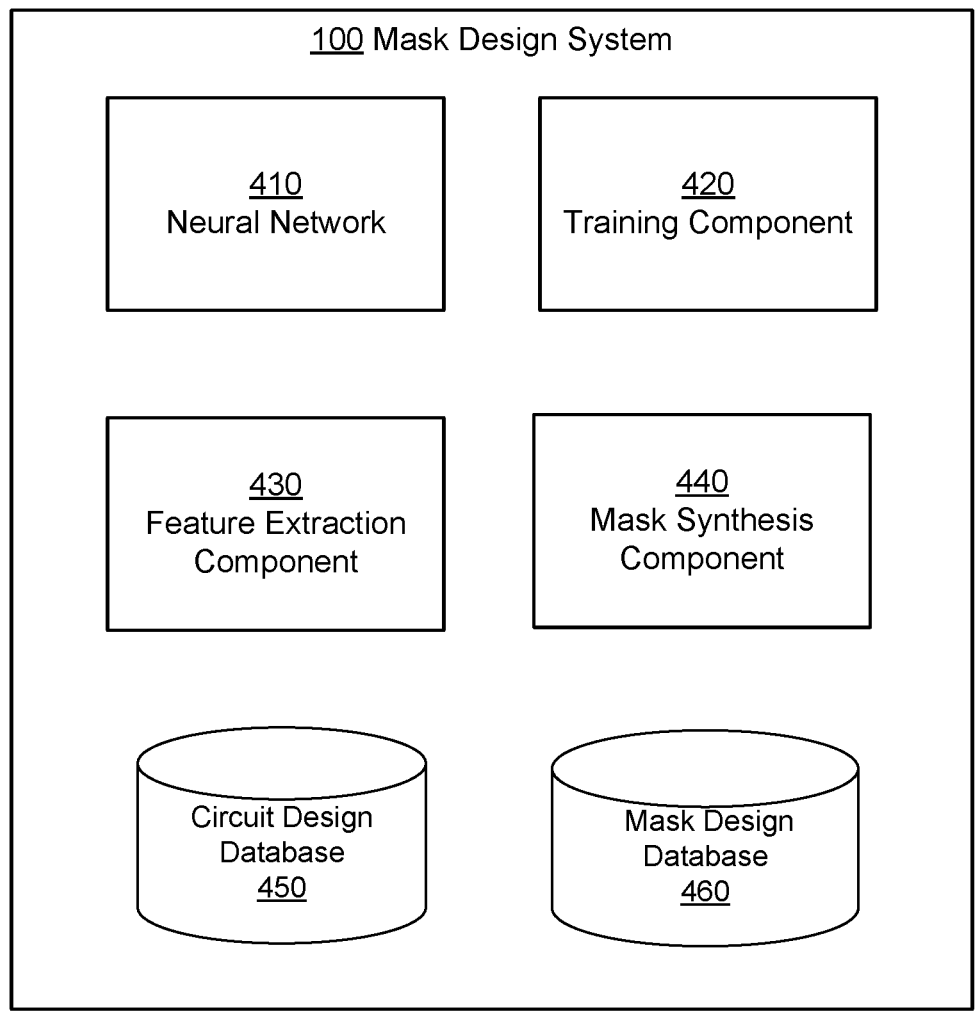
FIG. 4 shows a block diagram of a system architecture of a mask synthesis system according to an embodiment.

FIG. 4 shows a block diagram of a system architecture of a mask synthesis system according to an embodiment. The mask design system 100 includes a neural network 410, a training component 420, a feature extraction component 430, a mask synthesis component 440, a circuit design database 450, and a mask design database 460. Other embodiments may include more or fewer components than those indicated herein. Functionality indicated herein as being performed by a particular module may be performed by other modules than those indicated herein.

The circuit design database 460 stores the circuit designs that are processed by the mask design system 100 to generate masks. In an embodiment, the representation of the circuit design processed by the mask design system 100 is based on Graphic Design System (GDS) format, for example, GDSII format or the Open Artwork System Interchange Standard (OASIS) format. Other embodiments may represent the circuit design using other formats. The generated masks are stored in the mask design database 460.

The neural network 410 is configured to receive features describing the circuit design as input. The features describe the circuit design in a neighborhood of a location associated with a particular circuit design polygon. For example, the location may represent a point on an edge of the polygon, a point inside the polygon, or a point outside the polygon. The neural network 410 generates one or more offset distances from a circuit design polygon. The offset distance may be a distance along a normal to an edge of the circuit design polygon. The offset distances may be used for generating a main feature of the mask design, assist features for the mask design, or a target circuit design obtained by modifying the circuit design for target optimization. The offset distance may be positive or negative for both the main feature and for the assist features, which corresponds to exterior and interior assist feature polygon creation. The offsets for the target design can also be output. In an embodiment, the neural network 410 is a multi-layer perceptron. Although the embodiments described herein are based on neural networks, the techniques disclosed herein apply to other types of machine learning based models.

The training component 420 trains the neural network using labeled training dataset generated from previously generated mask designs for circuit designs, for example, mask designs generated using conventional design tools. The training component 420 applies the neural network to the training dataset and adjusts the weights of the neural network based on a loss function that measures the difference between the predicted output of the neural network and the labeled data. The training component 420 applies back propagation to adjust the weights of the neural network based on the loss function, for example, using gradient descent.

The feature extraction component 430 extracts various features of the circuit design for providing as input to the neural network 410. The feature extraction component 430 extracts features based on geometric measurements of polygons in the circuit design, for example, widths, spaces, curvature, and so on near a location. The features may be determined using functions of the local geometry such as levelset field values, Voronoi diagrams, convolutions of rasterized design polygons, and other transforms. The feature extraction component 430 also extracts features based on lithography simulation-based measurements such as aerial or resist image values near a location, for example, functions of values based on lithography simulation-based measurements on such as slope, minimums, maximums, and so on. Although embodiments disclosed herein describe the features for polygons, the technique disclosed apply to other types of geometric shapes, for example, curved shapes.

The mask synthesis component 440 invokes the various components of the mask design system 100 to generate masks for circuit designs. Accordingly, the mask synthesis component 440 loads circuit designs from the circuit design database 450, selects portions of the circuit design, for example, polygons from the circuit design, selects locations associated each polygon, extracts features using the feature extraction component, applies the neural network 410 to the extracted features to generate offset distances, and generates masks based on the offset distances.

In some embodiments, the mask design system 100 is implemented as a distributed system with multiple computer processors that process different portions of a circuit design in parallel. For example, the mask synthesis component 230 may process different portions of a circuit design in parallel and generate masks for the different portions of the circuit design in parallel.

The processes executed by the components of the mask design system 100 are described in detail below.

Overall Process of Mask Synthesis

Figure 5:
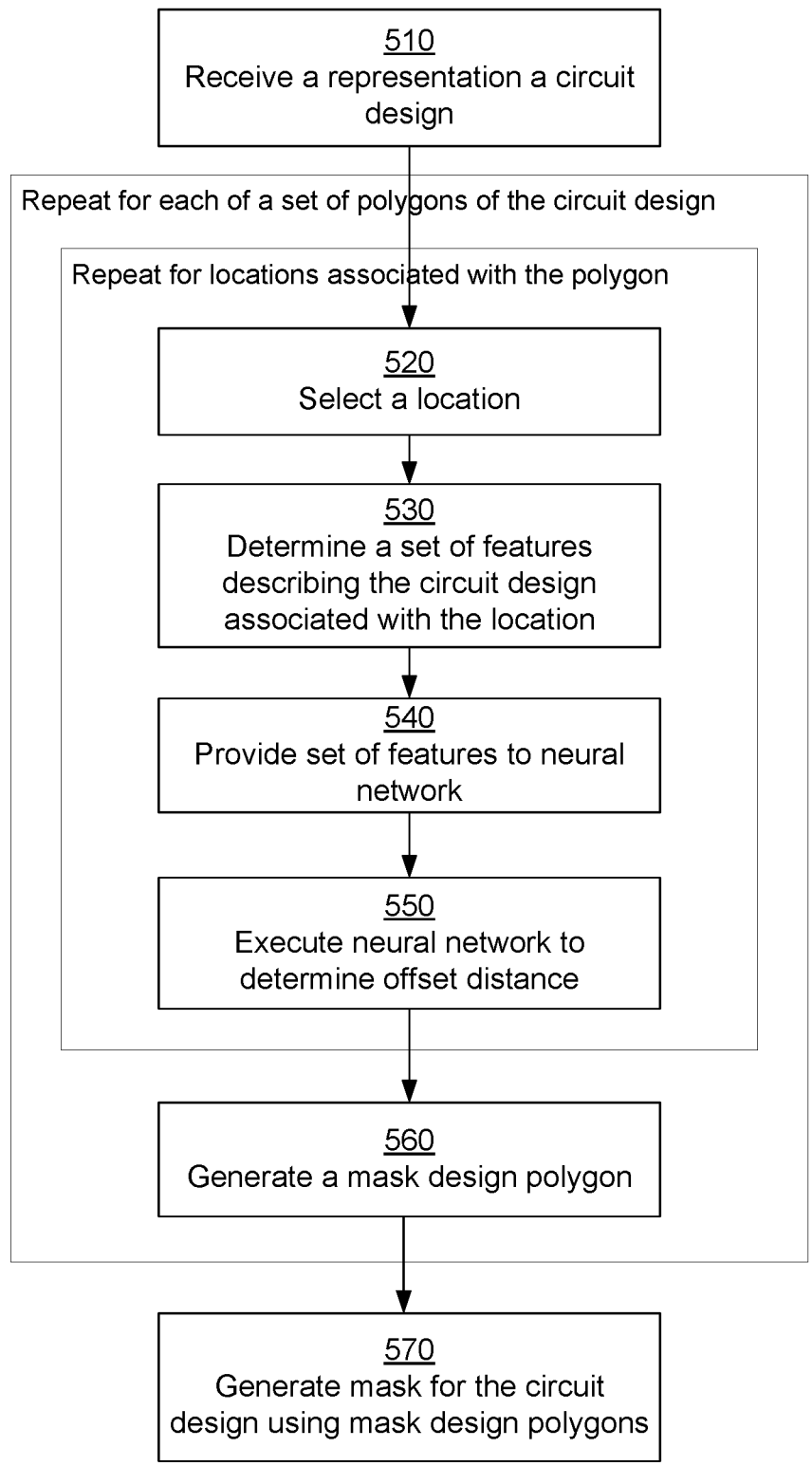
FIG. 5 depicts a flowchart of the process for performing mask synthesis of a circuit design according to an embodiment.

FIG. 5 depicts a flowchart of the process for performing mask synthesis of a circuit design according to an embodiment. The steps shown in the flowchart of FIG. 5 may be performed in an order different from that indicated in the flowchart. For example, certain steps may be performed in parallel with other steps. Furthermore, various steps shown in the flowchart may be performed using a parallel or distributed system.

The mask design system 100 receives 510 a circuit design representing a physical layout of a circuit. The mask design system 100 accesses the neural network 410. The mask design system 100 repeats the following steps for each of set of circuit design polygons obtained from the circuit design. For each circuit design polygon, the mask design system 100 identifies one or more locations associated with the circuit design polygon. The location may represent a point on an edge of the polygon or a point that is inside the polygon or outside the polygon.

The mask design system 100 repeats the steps 520, 530, 540, and 550 for each location. The mask design system 100 selects 520 a location associated with the circuit design polygon for processing. The mask design system 100 determines 530 a set of features describing the circuit design within a neighborhood of the selected location. The neighborhood may be defined as the portion of the circuit design that is within a threshold distance of the location. The mask design system 100 provides 540 the set of features as input to the neural network 410. The mask design system 100 executes 550 the neural network 410 to determine an offset distance from an edge of the circuit design polygon.

The mask design system 100 generates 560 a mask design polygon corresponding to the circuit design polygon based on the offset distance. The mask design polygon may represent a main feature or an assist feature of the mask design. For example, the mask design system 100 may move the edges of the circuit design polygon by the offset distances to obtain edges of the master feature. Alternatively, the mask design system may generate a mask design polygon representing an assist feature at an offset distance from an edge of the circuit design polygon. In an embodiment, the mask design system 100 uses the offset distance to modify the circuit design polygon to obtain a new target polygon that is used for generating the mask.

The mask design system 100 generates 570 a mask design for the circuit design using the generated mask design polygons. For example, the mask design system 100 may assemble the different mask design polygons obtained to generate the overall mask design.

The different steps of the process illustrated in FIG. 5 may be executed using multiple processors, for example, using a distributed architecture. For example, different portions of the circuit design may be processed in parallel to generate corresponding portions of mask design. Accordingly, a large circuit design may be split across a large number of processors to speed up the execution of the process.

Feature Extraction

The feature extraction component 430 extracts various features for each location X for providing as input to the neural network 410. The location X is assumed to be associated with an edge E of a circuit design polygon C. For example, the edge E may be the edge on which the location X lies or the edge that is closest to the location X if the location X is inside or outside C. The feature extraction component samples a set of points $P_i$ in the neighborhood of location X.

Figure 6:
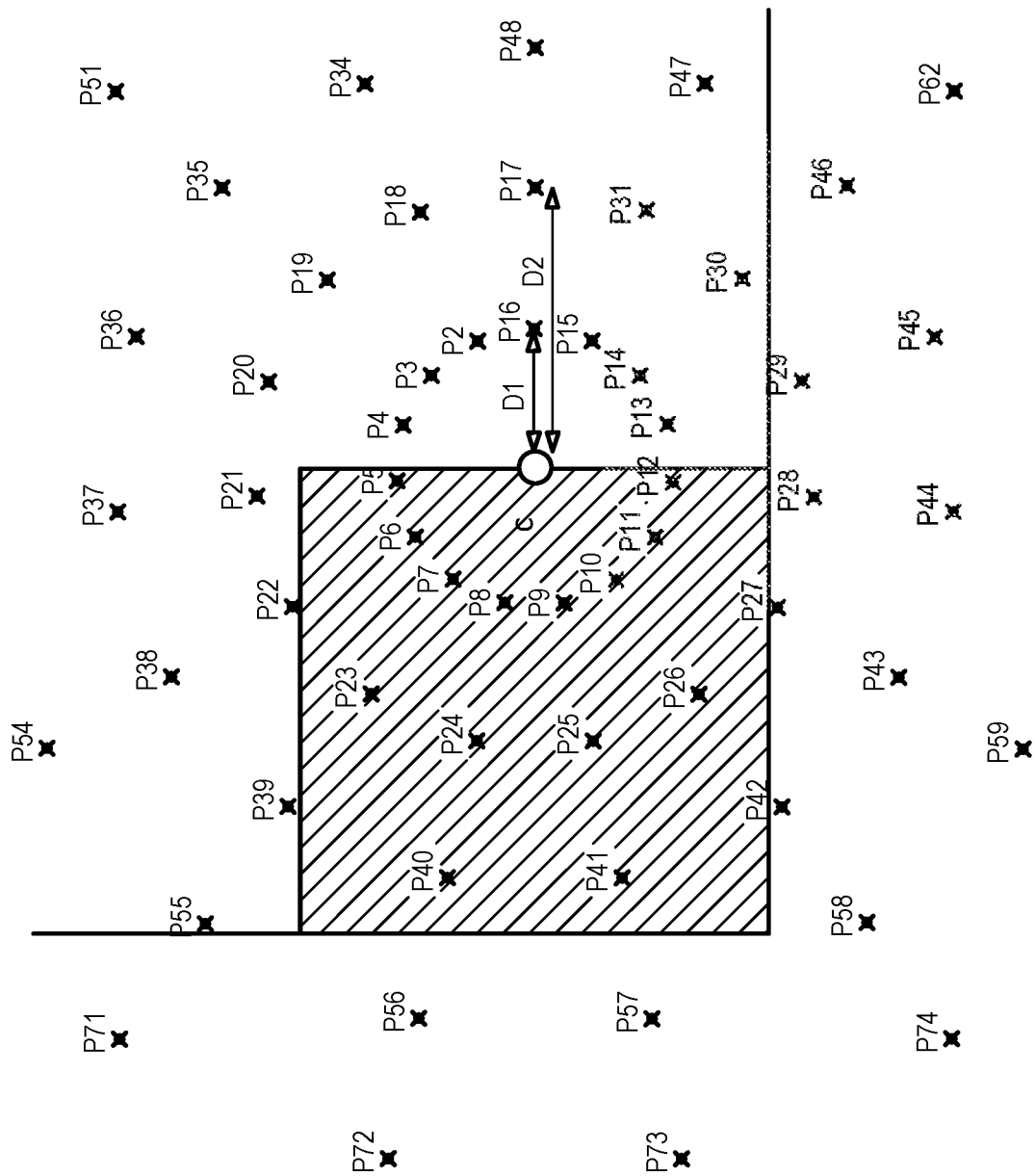
FIG. 6 illustrates feature extraction using sample points in the neighborhood of a location according to an embodiment.

FIG. 6 illustrates feature extraction using sample points in the neighborhood of a location according to an embodiment. The mask design system 100 selects a set of point $P_i$ in the neighborhood of the location X. The neighborhood may represent a region of the circuit design that is within a threshold distance of the location X. The mask design system 100 orders the points such that the same ordering is used for the sample points during training of the neural network and at inference time, i.e., at runtime when the neural network is executed for a new circuit design.

According to an embodiment, the mask design system 100 travels a distance D1 along a normal to the edge E of the circuit design polygon C. Starting from the point at a distance D1 from the edge E, the mask design system 100 travels in a circular fashion (in either clockwise or counterclockwise direction) and samples points at a uniform distance. FIG. 6 shows the mask design system 100 moving in a counterclockwise direction to sample points $P_1$, $P_2$, $P_3$, . . . , and so on. When the mask design system 100 completes a full circle at a distance D1, the mask design system 100 moves to an increased distance D2 that is normal to the edge E. The mask design system 100 repeats the counterclockwise rotation at the distance D2 completing another full circle at a distance D2 and sampling points at uniform distances. The mask design system repeats this process until it reaches the threshold distance that defines the neighborhood. This is an example mechanism to consistently order the points in the neighborhood of a location X and the mask design system 100 may use other mechanisms for ordering the sample points.

The feature extraction component 430 extracts a feature representing a width of a polygon associated with a point P that may represent the location X or sample point $P_i$. The feature extraction component 430 may travel in a direction normal edge E, such that the normal id directed inside the polygon to determine the other edge of the polygon C. The feature extraction component 430 uses the distance traversed as the width of the polygon. The feature extraction component 430 may traverse in a direction that is different from the normal to edge E, for example, to determine the width at an angle if the point P is at a corner or close to a corner of the polygon where two edges intersect.

The feature extraction component 430 may extract a feature representing spaces between polygons by traversing along a normal to the edge E that is directed outside of the polygon C to find the nearest neighboring polygon. The distance traversed to reach a nearest polygon represents a width of a space around the polygon. The feature extraction component 430 may traverse along a direction that is different from a normal, for example, to reach a point that is near an intersection of two edges of the circuit design polygon C.

The feature extraction component 430 may extract a feature representing curvature of the polygon in the neighborhood of the point P. The feature extraction component 430 may fit a circle through a set of edges of the polygon C and use an inverse of a radius of the circle as a measure of curvature.

Figure 7:
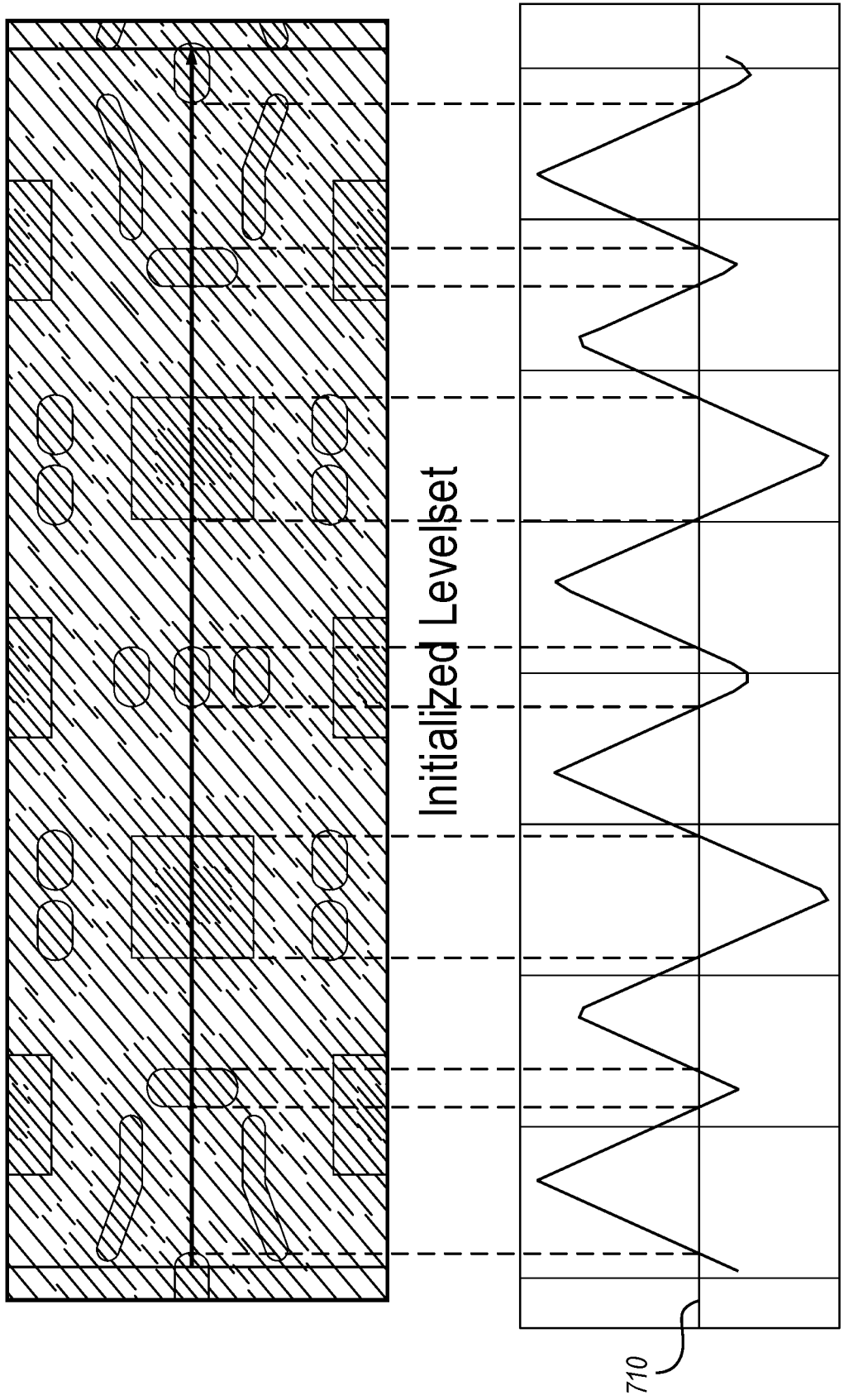
FIG. 7 illustrates feature extraction based on a levelset transformation of a layout according to an embodiment.

FIG. 7 illustrates feature extraction based on a levelset transformation of a layout according to an embodiment. As shown in FIG. 6, the feature extraction component 430 samples a set of points $P_i$ in the neighborhood of location X. In an embodiment, the levelset is generated with a distance function where the value of each pixel represents the minimum distance of that pixel to a point on an edge of a circuit design polygon. The feature extraction component 430 uses the levelset value at each sample point as features. Accordingly, the feature value corresponding to a sample point represents the distance from that point to the nearest edge of a circuit design polygon. FIG. 7 shows a threshold 710 such that sample points with levelset value below the threshold are inside circuit design polygons and sample points with levelset value above the threshold are outside circuit design polygons, and sample point having value equal to the threshold are on the edge of the circuit design polygons. Other embodiments may use features that determine the distance of sample points to an edge of a circuit design shape based on any technique, for example, using geometric searching.

Figure 8:
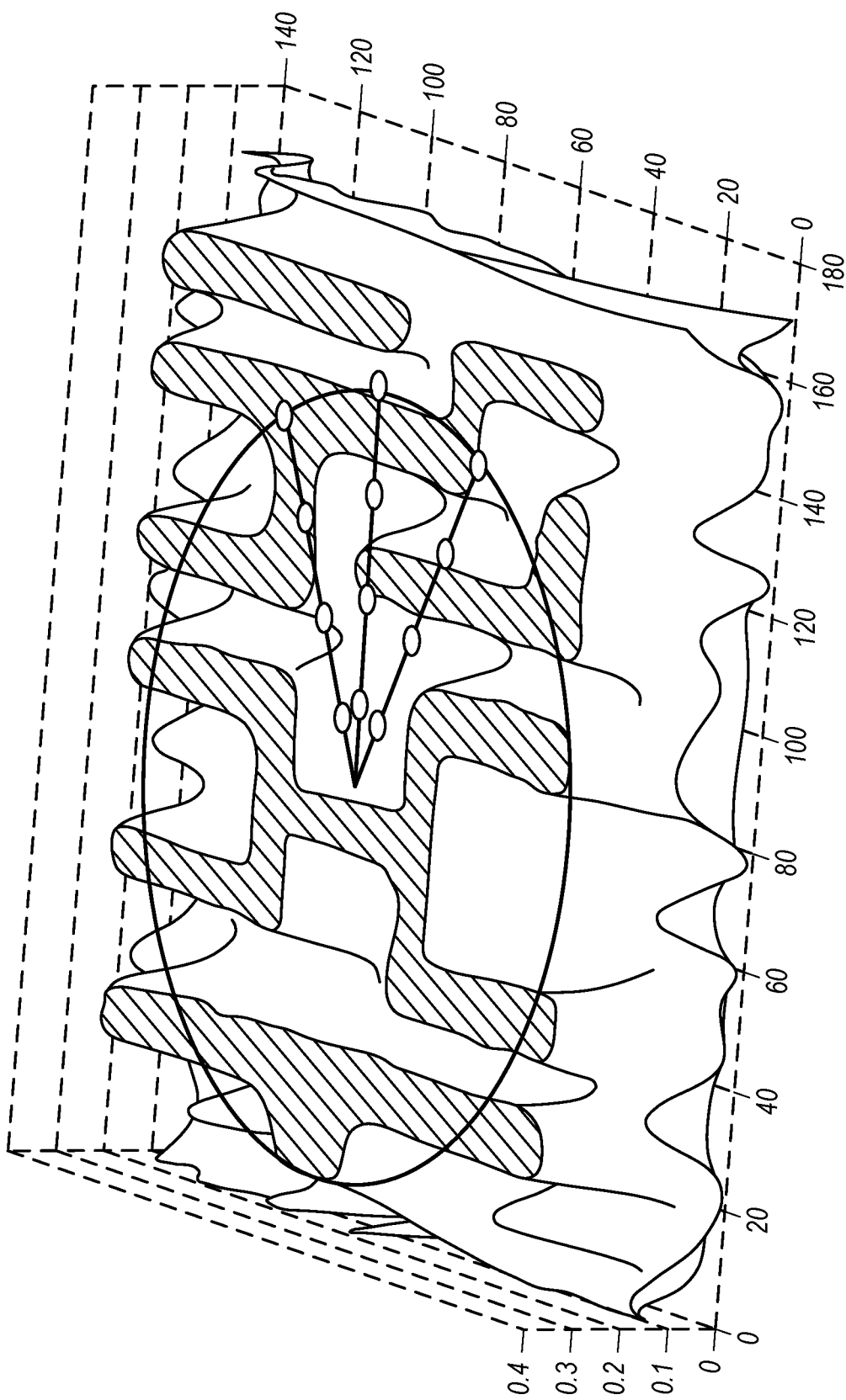
FIG. 8 illustrates feature extraction based on a resist image of a layout according to an embodiment.

FIG. 8 illustrates feature extraction based on a resist image of a layout according to an embodiment. The feature extraction component 430 may use values of the resist image at various sample points as the features. In an embodiment, the feature extraction component 430 uses lithographic simulation based measurements as features. The feature extraction component 430 uses an initial mask, for example, the circuit design polygons as an initial approximation of the mask. The initial mask may include the circuit design polygons along with some assist features determined based on the circuit design polygons.

The feature extraction component 430 performs lithographic simulation using the initial mask to generate aerial or resist image values. The feature extraction component 430 uses the aerial or resist image values near the location X. For example, the feature extraction component 430 may generate sample points near the location X as illustrated in FIG. 6 and determines the values of the image at the sample points as features. The feature extraction component 430 may use the slope of the image at the sample point as the feature. The feature extraction component 430 may use other attributes of the image, for example, a maximum or a minimum value of the image near a point as a feature.

In an embodiment, the feature extraction component 430 rasterizes a portion of the circuit design to generate a pixelated representation and performs a convolution on the pixelated image, for example, a convolution using a Gaussian kernel. The feature extraction component 430 uses the result of the convolution as a feature.

Figure 9:
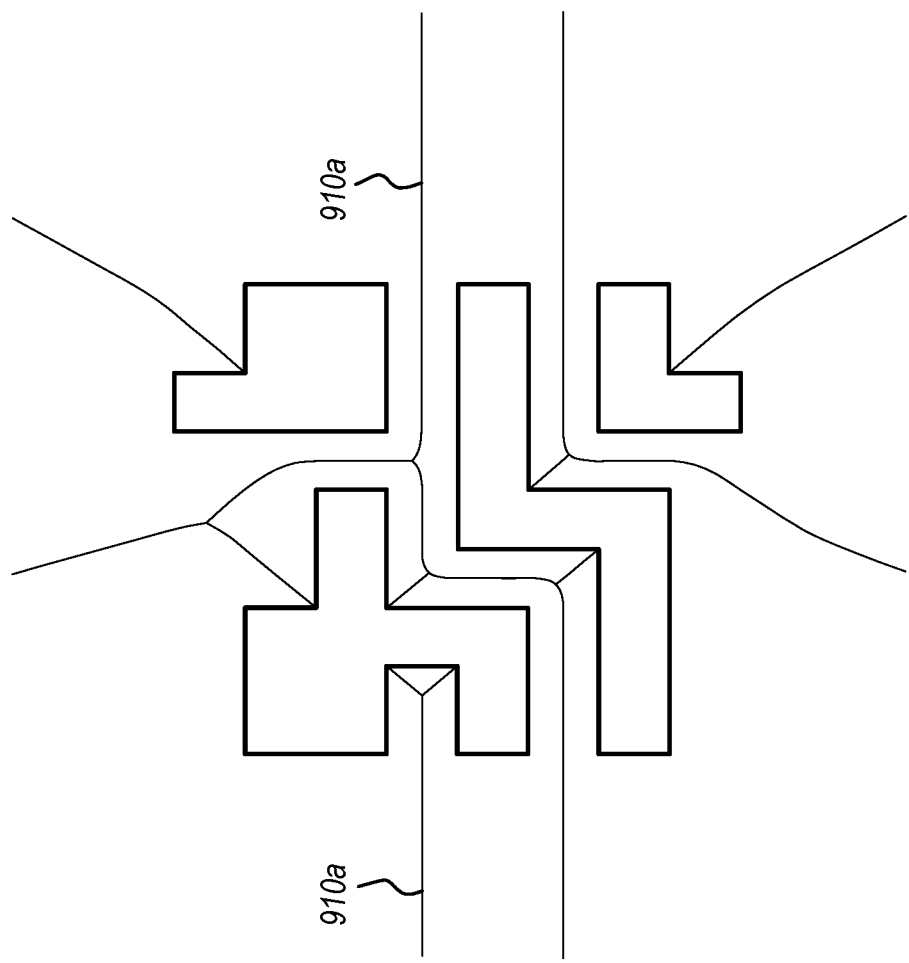
FIG. 9 illustrates feature extraction based on a medial axis of a layout according to an embodiment.

FIG. 9 illustrates feature extraction based on a medial axis 910 of a layout according to an embodiment. The medial axis represents points in the circuit design that have at least two closest points on the boundary of one or more polygons of the circuit design, for example, both points on the same polygon as shown in the portion 910a of medial axis or one point on one polygon and a second point on another polygon as shown in portion 910b of the medial axis. Accordingly, each point on the medial axis is equidistant from at least two points, each point on a polygon that is closest to the point. The feature extraction component 430 determines the medial axis for the circuit design and uses the distance between medial axis and the nearest edge of a circuit design polygon as a feature. The feature extraction component 430 extracts a feature representing distance from the medial axis determined at various sample points. For example, the feature extraction component 430 may convert the medial axis to a pixelated representation, for example, by computing the distance to the medial axis at every pixel in the domain. The feature extraction component 430 uses the distance values at the sample points from the pixelated representation of the medial axis as the features.

Mask Generation Based on Offset Distances

Figure 10:
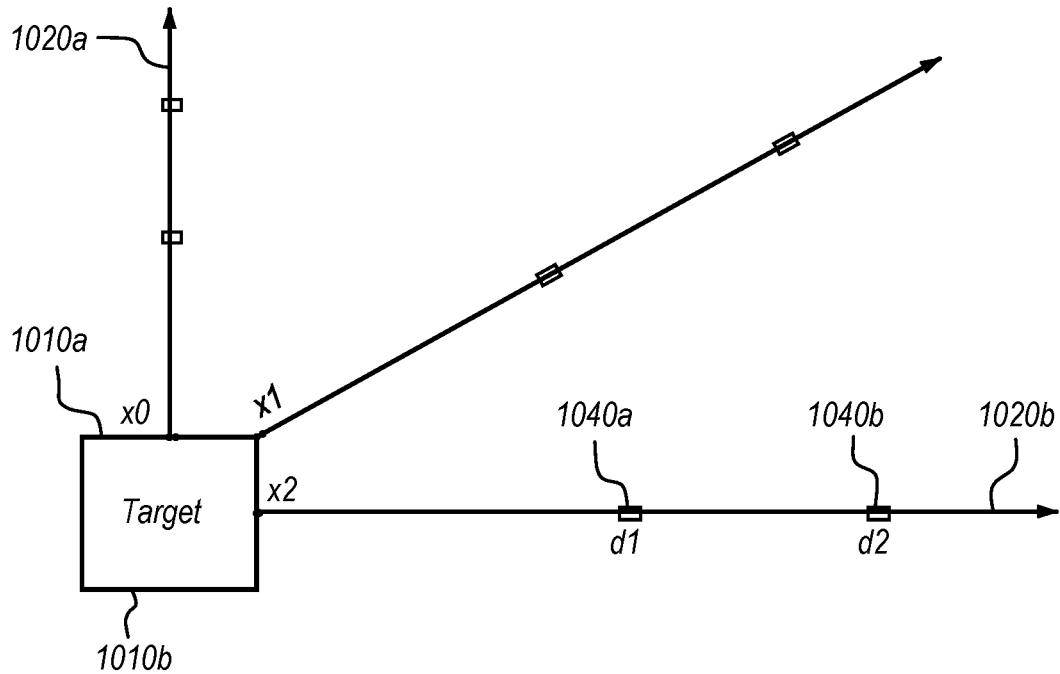
FIG. 10 illustrates output of neural network for a set of target locations according to an embodiment.

FIG. 10 illustrates output of neural network for a set of target locations according to an embodiment. As shown in FIG. 10, the outputs of the neural network 410 can be parameterized for a set of points, for example, x0, x1, x2 shown in FIG. 10. The mask synthesis component 440 extends perpendicular rays 1020 normal to the edges 1010 of the circuit design polygon. The mask synthesis component 440 identifies points 1040 at the offset distances d1 and d2 that are output by the neural network 410 along the rays 1020. The mask synthesis component 440 generates main features and assist features based on these points 1040 and also uses these points for target optimization.

Figure 11:
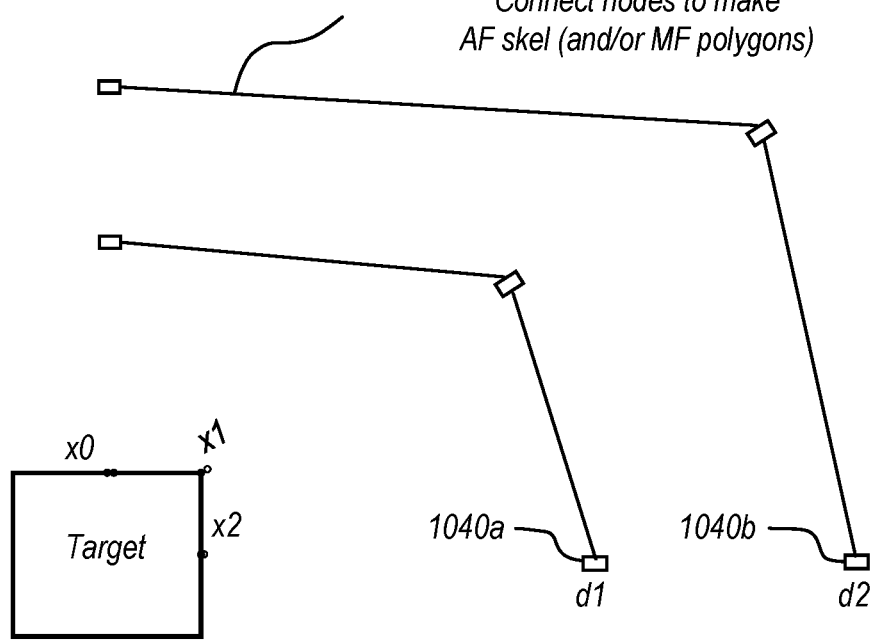
FIG. 11 illustrates generating an assist feature based on offset distances according to an embodiment.

FIG. 11 illustrates generating an assist feature based on offset distances according to an embodiment. The mask synthesis component 440 may connect corresponding points 1040 to determine edges of main features or assist features. For example, the mask synthesis component 440 may generate edges by connecting the points at the same distance d1 from the edges 1010 to generate edges for a main feature. The mask synthesis component 440 may combine edges by connecting points at distance d1 with edges formed by connecting points at distance d2 to generate assist features. The edges formed as shown in FIG. 11 are provided as input to tools that postprocess the polygons.

Figure 12:
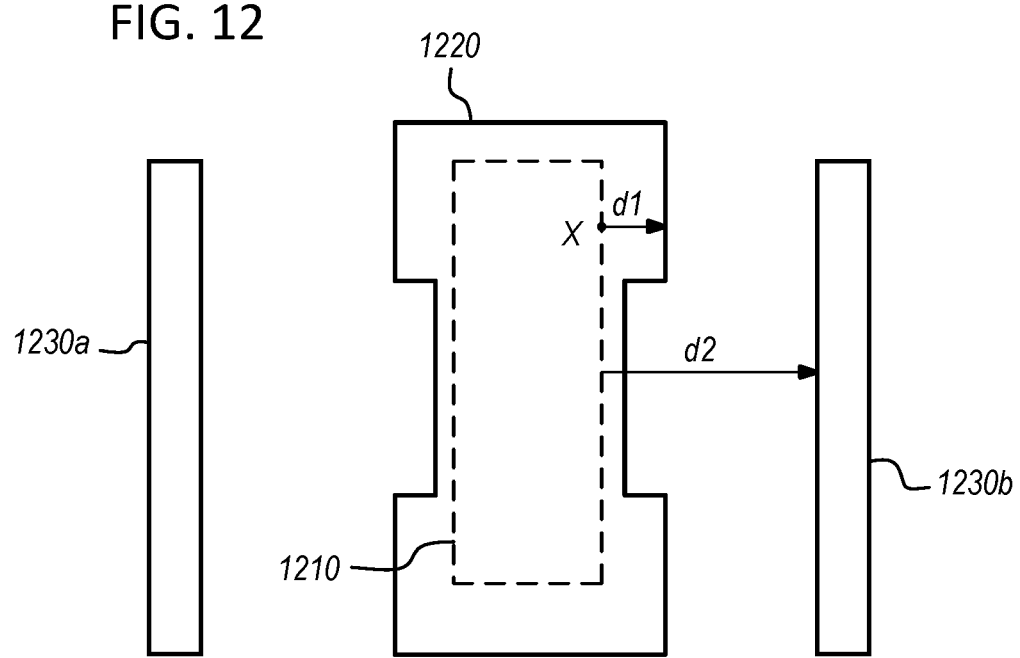
FIG. 12 illustrates generating a mask design polygon based on offset distances according to an embodiment.

FIG. 12 illustrates generating a mask design polygon based on offset distances according to an embodiment. For traditional OPC output where the offsets are stored for each subsegment of the circuit design edge, the mask synthesis component 440 provides the offset distance d output by the neural network 410 to an OPC tool that uses the offset distance d1 to generate the mask polygon 1220 from the circuit design polygon 1210. The OPC tool may use the offset distance d2 to generate an assist feature polygon 1230 from the circuit design polygon 1210. The OPC tool may obtain the mask design polygons 1220 and 1230 by combining edges obtained by moving segments of the edges of the circuit design polygon 1210 by offset distances.

Figure 13:
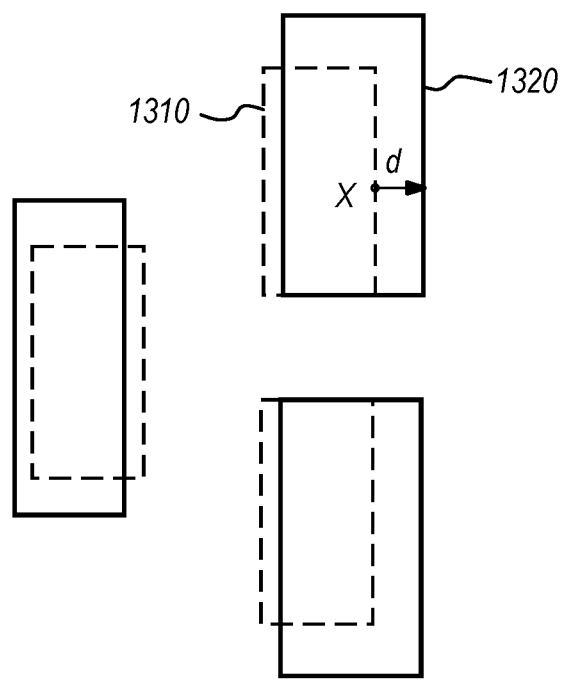
FIG. 13 illustrates target optimization based on offset distances according to an embodiment.

FIG. 13 illustrates target optimization based on offset distances according to an embodiment. For target optimization where the offsets are also stored for each subsegment of the design edge, we mask synthesis component 440 provides the offset distance, d, output by the neural network 410 to an OPC tool that creates a target polygon 1320 by modifying the input circuit design polygon 1310. The OPC tool may obtain the target circuit design polygon 1320 by combining edges obtained by moving segments of the edges of the circuit design polygon 1310 by offset distances.

Neural Network Architecture

Figure 14:
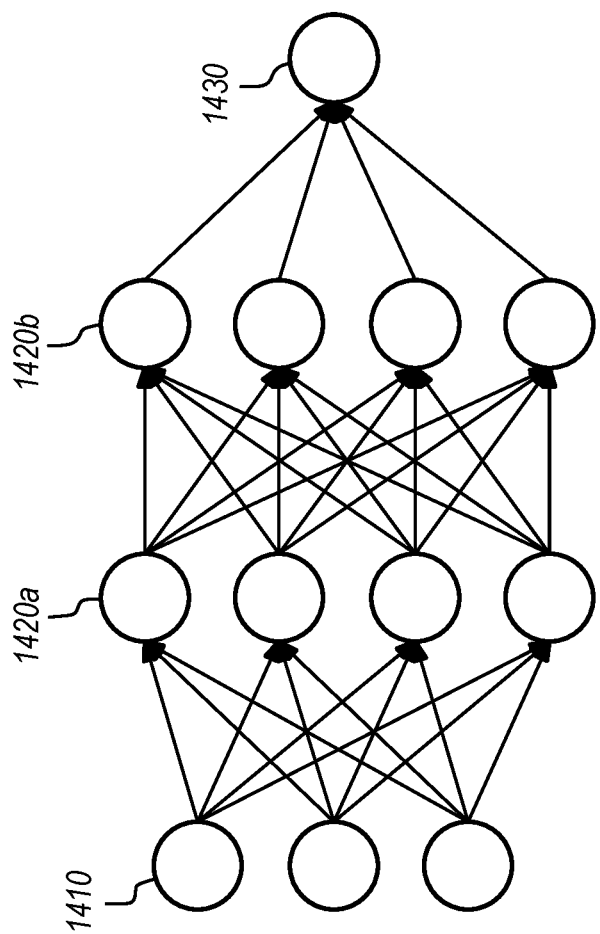
FIG. 14 illustrates an architecture of a neural network used for mask design according to an embodiment.

FIG. 14 illustrates an architecture of a neural network used for mask design according to an embodiment. As shown in FIG. 14, the neural network 410 is a multilayer connected neural network, for example a multilayer perceptron. The neural network includes an input layer 1410, one or more hidden layers 1420, and an output layer 1430. This embodiment uses different neural networks for each geometry type of the mask design that is generated. For example, a neural network may output offset distance used to generate main feature, another neural network that outputs offset distance used to generate assist feature, and another neural network that outputs offset distance used for target optimization.

Figure 15:
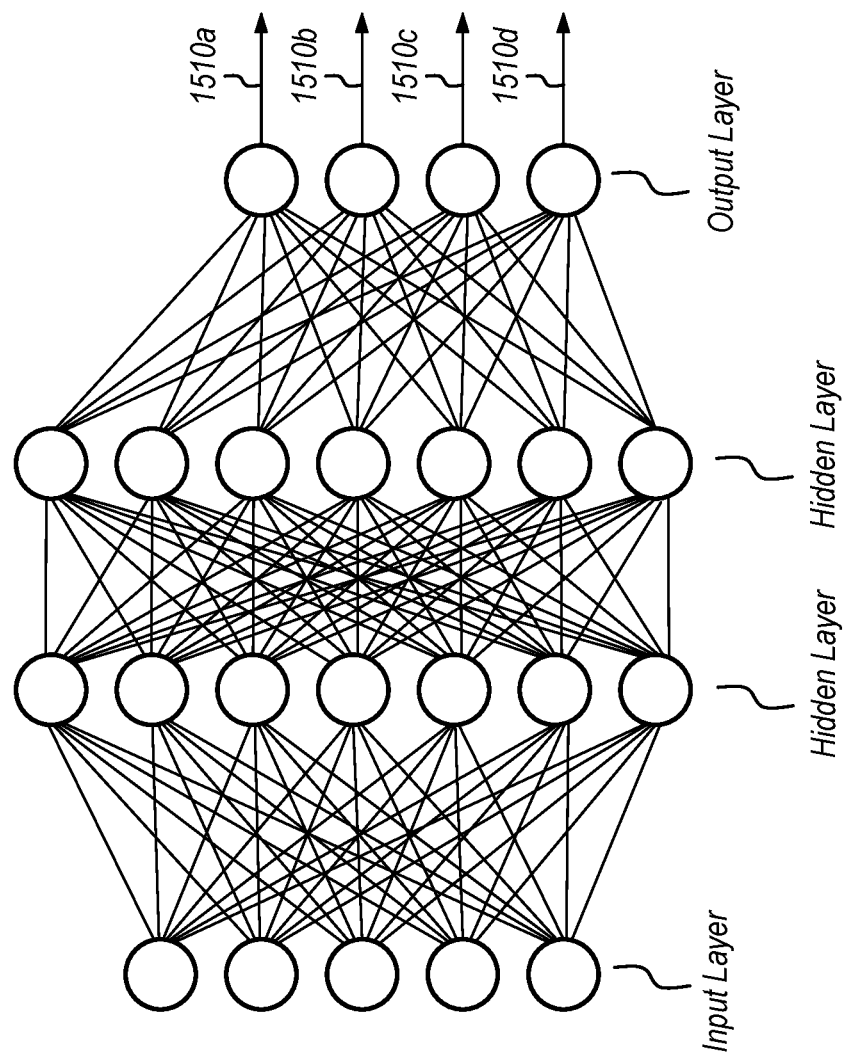
FIG. 15 illustrates an architecture of a neural network having multiple outputs used for mask design according to an embodiment.
Figure 16:
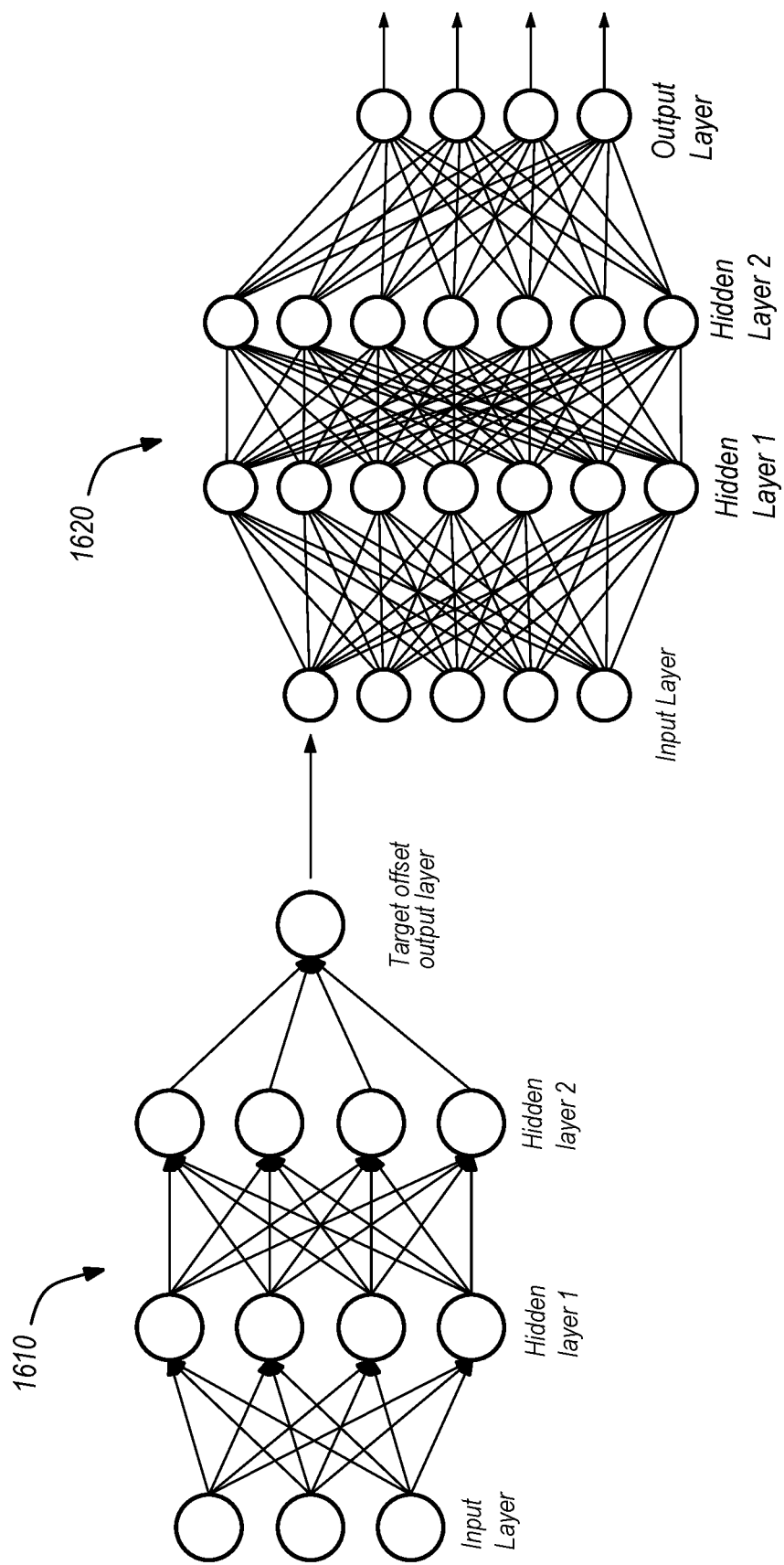
FIG. 16 illustrates an architecture of a neural network that provides input to another neural network used for mask design according to an embodiment.

FIG. 15 illustrates an architecture of a neural network having multiple outputs 1510 used for mask design according to an embodiment. In this embodiment, the same neural network generates multiple outputs 1510, one for each geometry type of the mask design that is generated. Accordingly, the neural network may generate one output representing offset distance used to generate main feature, another output representing offset distance used to generate assist feature, and another output representing offset distance used for target optimization FIG. 16 illustrates an architecture of a neural network that provides input to another neural network used for mask design according to an embodiment. For example, the neural network 1610 outputs offset distances used for target optimization. The result of target optimization is provided as input to the neural network 1620 that further generates offset distances used for generating main features and assist features.

Electronic Design Automation Process

Figure 17:
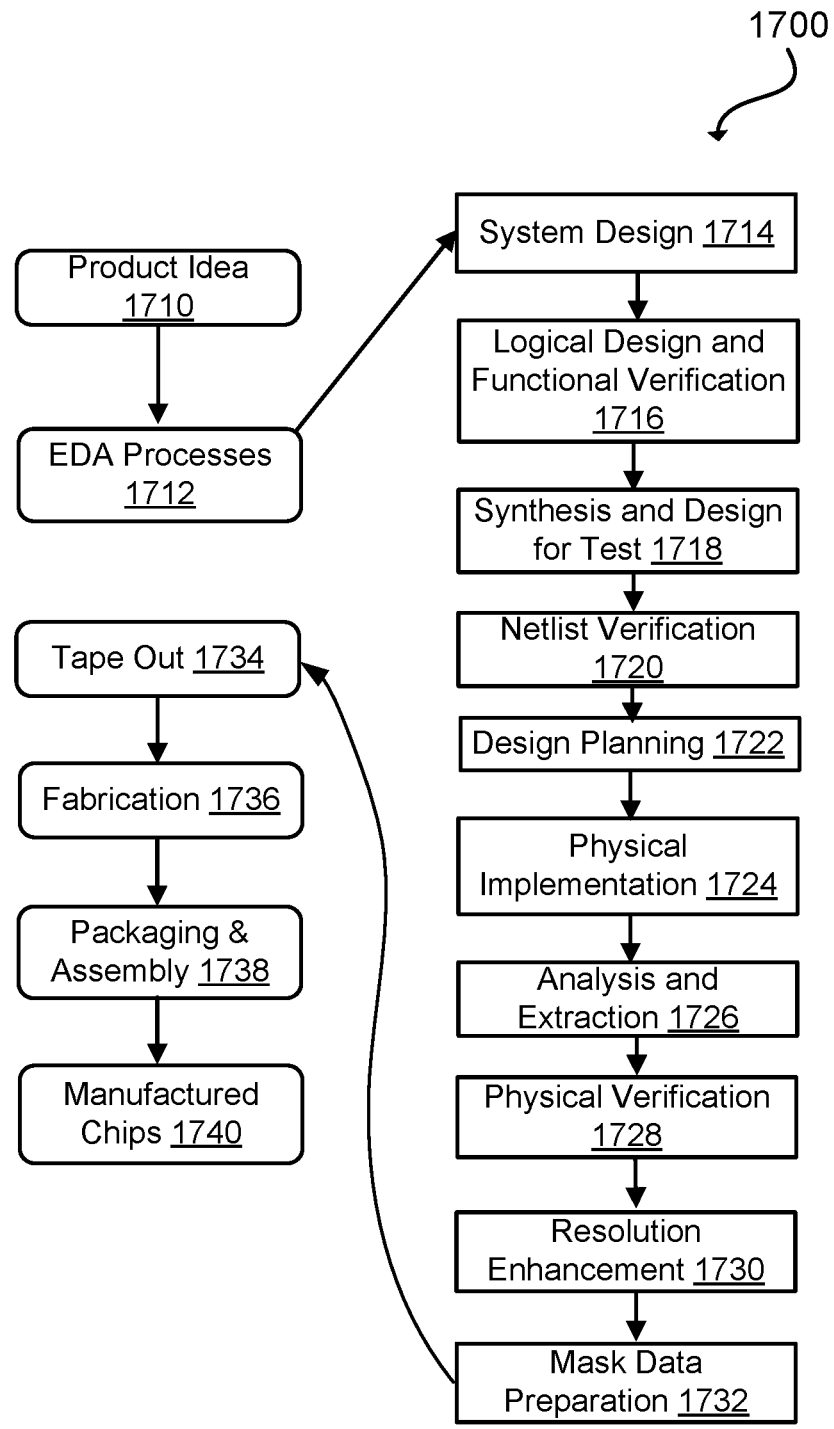
FIG. 17 depicts a flowchart of various processes used during the design and manufacture of an integrated circuit in accordance with some embodiments.

FIG. 17 illustrates an example set of processes 1700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1710 with information supplied by a designer, information which is transformed to create an article of manufacture that uses a set of EDA processes 1712. When the design is finalized, the design is taped-out 1734, which is when artwork (e.g., geometric patterns) for the integrated circuit is sent to a fabrication facility to manufacture the mask set, which is then used to manufacture the integrated circuit. After tape-out, a semiconductor die is fabricated 1736 and packaging and assembly processes 1738 are performed to produce the finished integrated circuit 1740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 17. The processes described by be enabled by EDA products (or tools).

During system design 1714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1720, the netlist is checked for compliance with timing constraints and for correspondence with the HDL code. During design planning 1722, an overall floor plan for the integrated circuit is constructed and analyzed for timing and top-level routing.

During layout or physical implementation 1724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1726, the circuit function is verified at the layout level, which permits refinement of the layout design. During physical verification 1728, the layout design is checked to ensure that manufacturing constraints are correct, such as DRC constraints, electrical constraints, lithographic constraints, and that circuitry function matches the HDL design specification. During resolution enhancement 1730, the geometry of the layout is transformed to improve how the circuit design is manufactured.

During tape-out, data is created to be used (after lithographic enhancements are applied if appropriate) for production of lithography masks. During mask data preparation 1732, the 'tape-out' data is used to produce lithography masks that are used to produce finished integrated circuits.

A storage subsystem of a computer system (such as the mask design system 100 of FIG. 1) may be used to store the programs and data structures that are used by some or all of the EDA products described herein, and products used for development of cells for the library and for physical and logical design that use the library.

Embodiments can be used for processing the circuit designs during various stages of the electronic design automation process that store the circuit layout, for example, layout or physical implementation 1724, analysis and extraction 1726, mask data preparation 1732, and so on.

Computer Architecture

Figure 18:
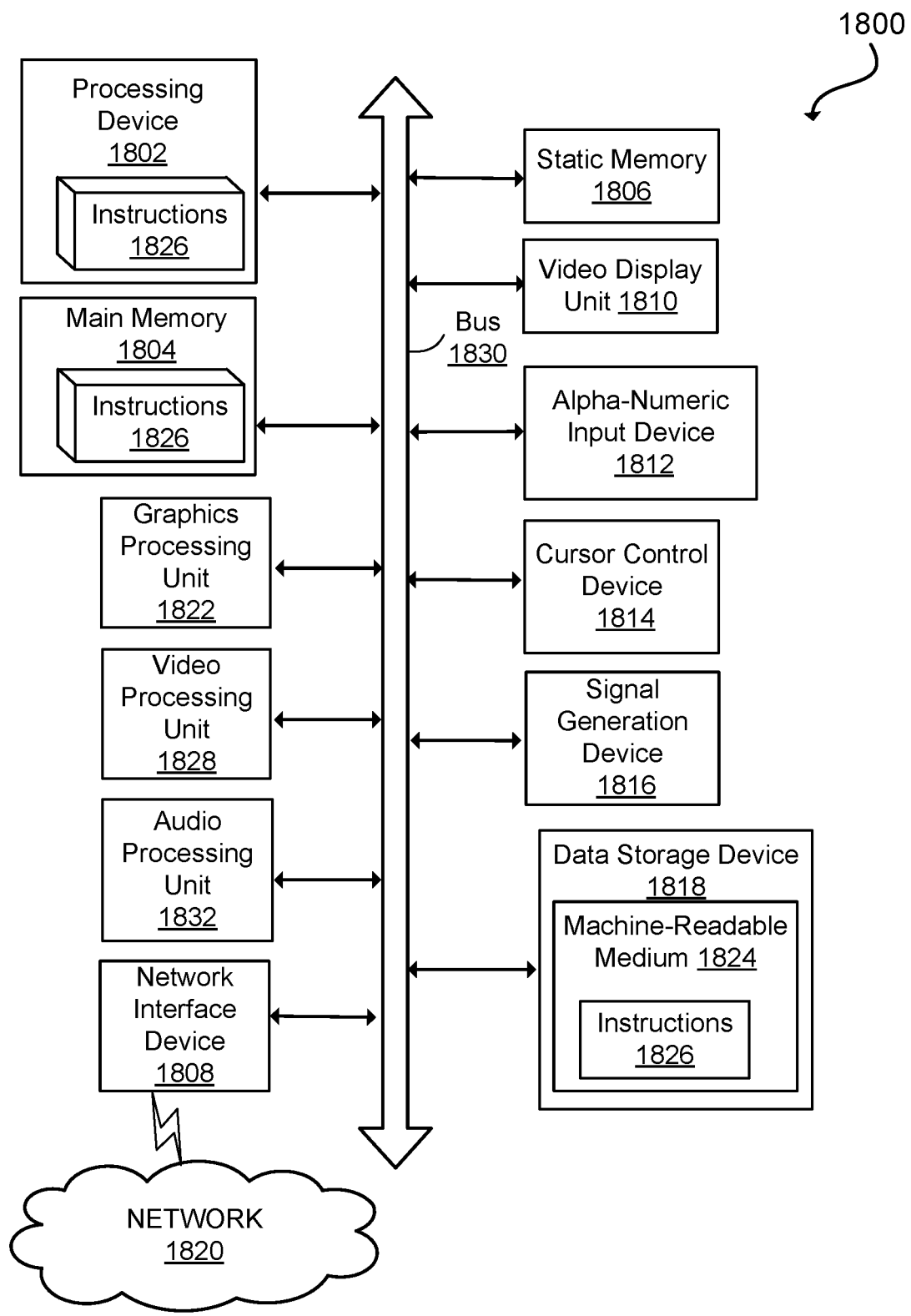
FIG. 18 depicts an abstract diagram of an example computer system in which embodiments may operate.

FIG. 18 illustrates an example machine of a computer system 1800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1800 includes a processing device 1802, a main memory 1804 (e.g., read-only memory (ROM), flash memory, dynamic random access memory (DRAM) such as synchronous DRAM (SDRAM), a static memory 1806 (e.g., flash memory, static random access memory (SRAM), etc.), and a data storage device 1818, which communicate with each other via a bus 1830.

Processing device 1802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1802 may also be one or more special-purpose processing devices such as an application specific integrated circuit (ASIC), a field programmable gate array (FPGA), a digital signal processor (DSP), network processor, or the like. The processing device 1802 may be configured to execute instructions 1826 for performing the operations and steps described herein.

The computer system 1800 may further include a network interface device 1808 to communicate over the network 1820. The computer system 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse), a graphics processing unit 1822, a signal generation device 1816 (e.g., a speaker), graphics processing unit 1822, video processing unit 1828, and audio processing unit 1832.

The data storage device 1818 may include a machine-readable storage medium 1824 (also known as a non-transitory computer-readable medium) on which is stored one or more sets of instructions 1826 or software embodying any one or more of the methodologies or functions described herein. The instructions 1826 may also reside, completely or at least partially, within the main memory 1804 and/or within the processing device 1802 during execution thereof by the computer system 1800, the main memory 1804 and the processing device 1802 also constituting machine-readable storage media.

In some implementations, the instructions 1826 include instructions to implement functionality corresponding to the present disclosure. While the machine-readable storage medium 1824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for performing mask synthesis for a circuit design based on machine learning, the method comprising:
   receiving, by a processing device, the circuit design representing a physical layout of a circuit, the circuit design comprising a plurality of circuit design polygons;
   training a machine learning based model using labeled training dataset generated from previously generated mask designs for circuit designs, the machine learning based model trained to predict an offset distance from a circuit design polygon of an input circuit design for generating a mask design;
   for a circuit design polygon selected from the plurality of circuit design polygons:
      selecting a location associated with the circuit design polygon;
      determining a set of features comprising feature values representing a neighborhood of the location, the neighborhood comprising a plurality of points within a threshold distance of the location, the set of feature values ordered by traversing the plurality of points using an ordering scheme used during training of the machine learning model;
      providing the set of features as input to the machine learning based model;
      executing the machine learning based model to determine an offset distance from an edge of the circuit design polygon; and
      generating a mask design polygon corresponding to the circuit design polygon based on the offset distance; and generating, by the processing device, a mask design for the circuit design using the generated mask design polygons.

2. The method of claim 1, wherein the machine learning based model is a neural network configured to:
receive as input, features describing the circuit design within a neighborhood of an input location associated with a particular circuit design polygon;
output an offset distance from an edge of the particular circuit design polygon; and
wherein the neural network is executed with the set of features provided as input to the neural network.

3. The method of claim 2, wherein the neural network is a multi-layer perceptron.

4. The method of claim 1, wherein the set of features comprises a feature representing a width of the circuit design polygon in the neighborhood of the location.

5. The method of claim 1, wherein the set of features comprises a feature representing a curvature of the circuit design polygon in the neighborhood of the location.

6. The method of claim 1, wherein the set of features comprises a feature representing a depth of space between the circuit design polygon and another circuit design polygon in the neighborhood of the location.

7. The method of claim 1, wherein the set of features comprises a feature value at each sample point representing a distance of the sample point from the edge of a circuit design shape.

8. The method of claim 1, wherein the set of features comprises a feature value at each sample point representing a distance from a medial axis of the circuit design.

9. The method of claim 1, wherein determining a feature comprises:
rasterizing a circuit design polygon to generate a pixelated representation;
performing a convolution of the pixelated representation of the circuit design polygon; and
using the output of the convolution at each sample point as a feature.

10. The method of claim 1, wherein determining a feature comprises:
performing lithography simulation of the circuit design to generate a resist image; and
using a feature of the resist image at each sample point, wherein the feature of the resist image is one of a maxima, a minima, or a slope.

11. The method of claim 1, wherein generating a mask design polygon corresponding to the circuit design polygon comprises:
identifying a plurality of points, each point at an offset distance from a location of the circuit design polygon; and
determining a mask design polygon representing an assist feature that connects the plurality of points.

12. The method of claim 1, wherein the offset distance is a distance determined along a normal from an edge of the circuit design polygon.

13. The method of claim 1, wherein the location is a point on an edge of the circuit design polygon.

14. The method of claim 1, wherein the offset distance represents the distance between an edge of a polygon of the mask design and the corresponding edge of a corresponding polygon of the circuit design.

15. The method of claim 1, wherein a mask design polygon corresponding to a circuit design polygon represents a main feature of the mask design, wherein one or more edges of the mask design polygon are at an offset distance from a corresponding edge of the circuit design polygon.

16. The method of claim 1, wherein generating a mask design polygon corresponding to the circuit design polygon comprises:
performing target optimization by modifying the circuit design polygon according to the offset distance to obtain a target circuit design polygon that is further used for generating the mask design polygon.

17. A non-transitory storage medium storing instructions that when executed by a processor, cause the processor to perform operations for performing mask synthesis for a circuit design based on machine learning, the operations comprising:
receiving the circuit design representing a physical layout of a circuit, the circuit design comprising circuit design polygons;
for a circuit design polygon selected from a plurality of circuit design polygons:
selecting a location associated with the circuit design polygon;
training a machine learning based model using labeled training dataset generated from previously generated mask designs for circuit designs, the machine learning based model trained to predict an offset distance from a circuit design polygon of an input circuit design for generating a mask design;
determining a set of features comprising feature values representing a neighborhood of the location, the neighborhood comprising a plurality of points within a threshold distance of the location, the set of feature values ordered by traversing the plurality of points using an ordering scheme used during training of the machine learning model;
providing the set of features as input to the machine learning based model;
executing the machine learning based model to determine an offset distance from an edge of the circuit design polygon; and
generating a mask design polygon corresponding to the circuit design polygon based on the offset distance; and
generating a mask design for the circuit design using the generated mask design polygons.

18. A system comprising:
a processor; and
a non-transitory storage medium storing instructions that when executed by the processor, cause the processor to perform operations for performing mask synthesis for a circuit design based on machine learning, the operations comprising:
receiving the circuit design representing a physical layout of a circuit, the circuit design comprising a plurality of circuit design polygons;
training a machine learning based model using labeled training dataset generated from previously generated mask designs for circuit designs, the machine learning based model trained to predict an offset distance from a circuit design polygon of an input circuit design for generating a mask design;
for a circuit design polygon selected from the plurality of circuit design polygons:
selecting a location associated with the circuit design polygon;
determining a set of features comprising feature values representing a neighborhood of the location, the neighborhood comprising a plurality of points within a threshold distance of the location, the set of feature values ordered by traversing the plurality of points using an ordering scheme used during training of the machine learning model;

providing the set of features as input to the machine learning based model;

executing the machine learning based model to determine an offset distance from an edge of the circuit design polygon; and generating a mask design polygon corresponding to the circuit design polygon based on the offset distance; and generating a mask design for the circuit design using the generated mask design polygons.

19. The non-transitory storage medium of claim 17, wherein a feature represents a width of the circuit design polygon in the neighborhood of the location.

20. The non-transitory storage medium of claim 17, wherein a feature represents a curvature of the circuit design polygon in the neighborhood of the location.

* * * * *